(12) United States Patent
Shkolnikov

(10) Patent No.: US 6,947,028 B2
(45) Date of Patent: Sep. 20, 2005

(54) ACTIVE KEYBOARD FOR HANDHELD ELECTRONIC GADGETS

(76) Inventor: Mark Shkolnikov, 2883 Franklin Oaks Dr., Oak Hill, VA (US) 20171

( * ) Notice: Subject to any disclaimer, the term of this patent is extended or adjusted under 35 U.S.C. 154(b) by 298 days.

(21) Appl. No.: 10/320,529

(22) Filed: Dec. 17, 2002

(65) Prior Publication Data

US 2003/0122784 A1 Jul. 3, 2003

Related U.S. Application Data

(60) Provisional application No. 60/342,382, filed on Dec. 27, 2001.

(51) Int. Cl.[7] .............................................. G09G 5/00
(52) U.S. Cl. ...................................... 345/156; 345/168
(58) Field of Search ............................... 345/156, 157, 345/158, 159, 168, 169, 172, 173; 715/455, 738, 739, 823, 839, 840

(56) References Cited

U.S. PATENT DOCUMENTS 5,818,437 A    10/1998   Grover et al.
5,854,624 A    12/1998   Grant
6,164,853 A    12/2000   Foote
6,573,883 B1 *   6/2003   Bartlett ........................ 345/156
2002/0057259 A1 *   5/2002   Suzuki
2002/0097227 A1 *   7/2002   Chu et al.

* cited by examiner

Primary Examiner—Richard Hjerpe
Assistant Examiner—Tammy Pham
(74) Attorney, Agent, or Firm—Litman Law Offices, Ltd.

(57) ABSTRACT

An active keyboard for handheld electronic devices which allows the user of the device to support the device and enter text and data while using only one hand. The device has a housing, a display, a processor, a memory, a selection device, and at least four keys. When the handheld device is gripped the keys underlay the tips of the user's fingers and the selection device underlays the user's thumb. The software outputs a grid design to the display showing several columns of values. The user highlights a set of four values using the selection device and those values are assigned to the keys. Pressing a key enters the values assigned to that key into the text area of the display or if the value represents a mode of operation, runs the program controlling that mode.

9 Claims, 9 Drawing Sheets

ACTIVE KEYBOARD FOR HANDHELD ELECTRONIC GADGETS

CROSS-REFERENCE TO RELATED APPLICATION

This application claims the benefit of U.S. Provisional Patent Application Ser. No. 60/342,382, filed Dec. 27, 2001.

BACKGROUND OF THE INVENTION

1. Field of the Invention

The present invention relates generally to handheld data entry devices. In particular, this invention relates to an active keyboard and related software for entering data into a handheld device.

2. Description of Related Art

Portable electronic devices are rapidly becoming smaller while their capabilities are continually increasing. Shrinking size has limited the ability of the user to physically manipulate the keyboard in order to input information into the electronic device and access information from the device. Some electronic devices have been produced with miniature keyboards, but these have proven difficult to use and the keys are too small for fast entry of data with the fingers. Using normal size keys for a complete keyboard limits how small a device can be due to the necessary width of the keyboard. Some companies have created normal size keyboards that break into two overlapping pieces when the computer is not in use, but even then the device must still be relatively large.

Today many electronic devices are small enough to fit into the palm of the hand. With such small size it would be desirable to be able to quickly enter data, use as a pointing device to select options or to navigate the Internet with one hand, where that one hand not only supports the device but is also able to quickly enter data or commands using all five digits. A device for quickly and efficiently entering data, including full text, with a limited number of keys, such as that provided by the present invention, is needed in order to fully utilize the power of these small electronic devices.

The prior art has shown several methods of data entry using a limited number of full size keys. One such method is the "multi-tap" method. This method involves using twelve or more keys with several letters or symbols assigned to each key. The user taps each key until the desired letter appears on the device's display. Then the user typically hits an input key that will input that value into the device and move to the next data input position. This system allows the user to input complete text messages using a limited number of keys, but it is a time consuming system due to the excessive number of keystrokes required, it has no Internet browsing capability, and it forces the user to shift the position of his fingers from key to key, further reducing keystroke efficiency.

Another method of inputting data using a limited number of keys is the Tegic system described in U.S. Pat. No. 5,818,437. This system also assigns each key a plurality of values, but eliminates the need to press each key multiple times. The user simply presses each desired key once and the computer attempts to decipher what word the user intended to input out of the several possible words which could be formed from the several letters on each key. If the computer comes up with the wrong word the user can scroll through a number of other possibilities. This system is effective in reducing the number of keystrokes as compared to the multi-tap method. It cannot, however, be used to input names, it has a limited vocabulary, it has no application to Internet browsing, and it cannot be used without the user changing finger position on the keys.

U.S. Pat. No. 5,854,624 is an example of a pocket-sized interface for Internet browsing. This device uses a touch sensitive switch and several keys to allow a user to interface with the Internet. While this system does function to allow a user to navigate the Internet, it shows no way of entering data such as text and numbers, and is not designed for one hand operation.

U.S. Pat. No. 6,164,853 is also relevant in that it discloses an ergonomic housing for a handheld device. This invention fits over a standard electronic device such as a remote control and allows the user to comfortably operate such a device using only one hand. This device does not, however, disclose any method for quickly entering a variety of data, nor show any method of navigating the Internet.

None of the above inventions and patents, taken either singly or in combination, is seen to describe the instant invention as claimed.

SUMMARY OF THE INVENTION

Today computer chips are becoming smaller and more powerful, allowing for the creation of devices that are too small for traditional QWERTY keyboards. This has created a need for a keyboard system that will allow a user to quickly input all types of data and easily navigate the Internet while operating and supporting a handheld device with only one hand.

The active keyboard system for handheld devices of the present invention has a housing, a processor, memory, software, a display, several keys, and at least one selection device. This invention allows the user to input full text messages and a variety of other characters into a handheld device without taking his fingers off the keys. This is accomplished by changing the values assigned to the keys, thus obviating the need to shift finger position while inputting commands or data into the device.

The active keyboard device is operated using the selection device to move through different options created by the software (e.g. text messaging, number dialing). When a mode of operation has been selected which requires data to be entered into the device an assignment grid system is used. Groups of four values are selected from the assignment grid using the selection device. Each value from the selected group of values is then assigned to a key. The active keyboard system has at least one key for each finger arranged so that when the handheld device is held the fingertips rest upon the keys.

The active keyboard system also is adapted for use when navigating the Internet. A portion of a web page is shown on the display along with a cursor which appears in the middle of the display. The portion of the web page shown on the display can be changed to a different portion of the page using the selection device. When the displayed view of the web page reaches the boundary edge of the page, the displayed view of the page stops moving, but the cursor can then be moved from its position in the center of the display to the edge of the page using the selection device.

The active keyboard system for handheld electronic devices optionally may include motion sensors which detect physical movements of the electronic device. These movements are interpreted as commands by the software and can be substituted for commands generated by the selection device.

Accordingly, it is a principal object of the invention to allow a user of a handheld electronic device to input a wide range of data into the device and support that device through the use of only one hand.

It is another object of the invention to allow the user of the device to enter a wide range of data rapidly without having to remove their fingers from the keys.

It is a further object of the invention to allow the user of a handheld electronic device to navigate the Internet on a handheld device utilizing the same keyboard which is also designed to enter text.

Still another object of the invention is to allow the user of a handheld device to navigate the Internet using one hand to both support the device and control navigation functions.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
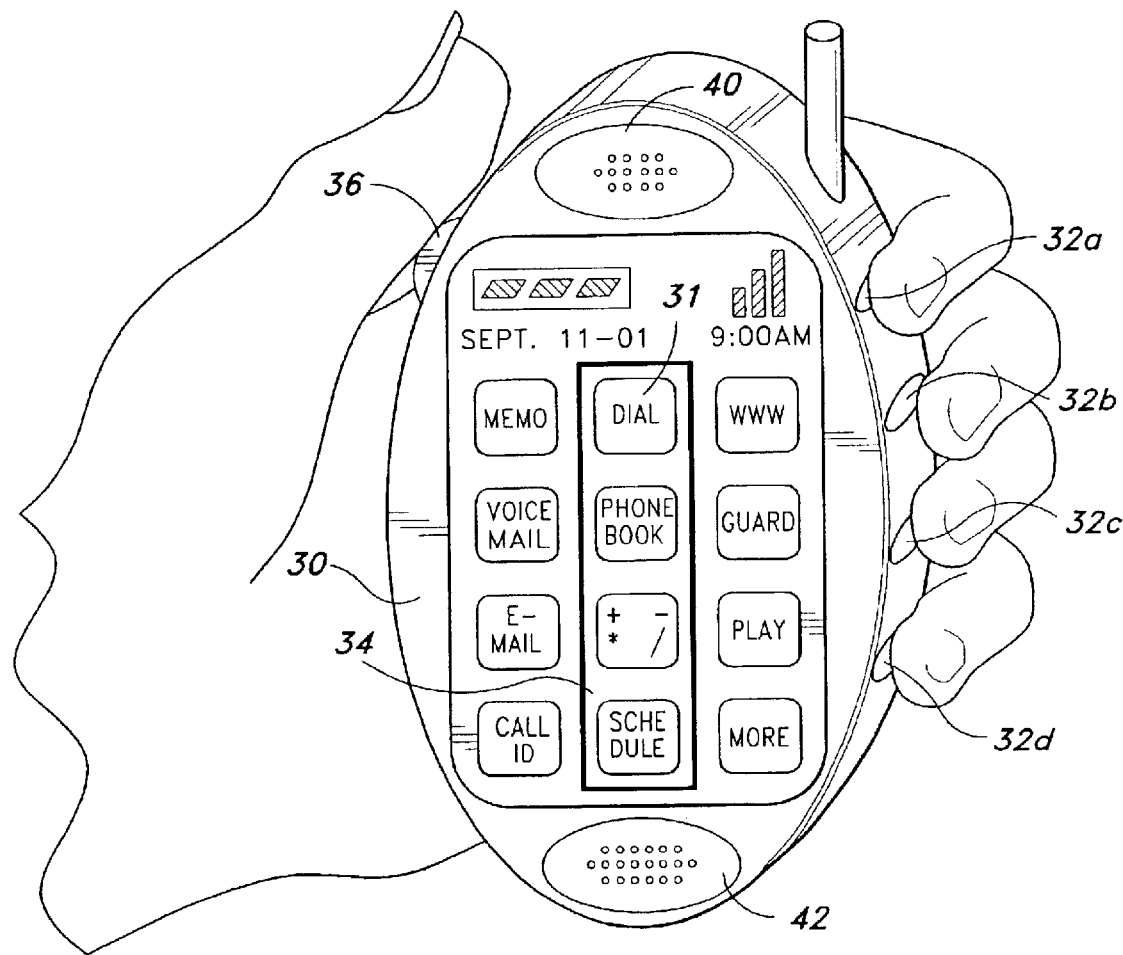
FIG. 1 is an environmental, perspective view of a active keyboard for handheld electronic devices according to the present invention in a cell phone embodiment for use by a left-handed person.

The present invention is an active keyboard system for handheld electronic devices which provides users of handheld devices with the ability to enter alphanumeric text and data into the device using only one hand. The system may be incorporated into a variety of electronic devices, for example, the embodiment of the invention when incorporated into a cellular phone as shown in FIG. 1. Other possible devices include, but are not limited to, personal digital assistants, pagers, G.P.S. receivers, and remote controls. The invention has an ergonomic housing 30 with a front, back, top, bottom and two sides, a plurality of keys 32a, 32b, 32c and 32d, a display 34, a selection device 36, a speaker 40, a microphone 42, a processor, a memory, and software. The keys 32a–32d are positioned on the side of the housing 30 so that they underlie the fingertips of the user when the device is held during normal operation. The selection device 36 is positioned on the side of the housing opposite the keys so that it is disposed under the thumb of the user of the device when the device is held. The embodiment in FIG. 1 is for a left handed user. For right hand operation, the selection device 36 and the plurality of keys 32 are moved to opposite sides of the device to create a mirror image of the device shown in FIG. 1. The cell phone in FIG. 1 has a conventional speaker 40 and microphone 42 above and below the display 34.

Figure 2A:
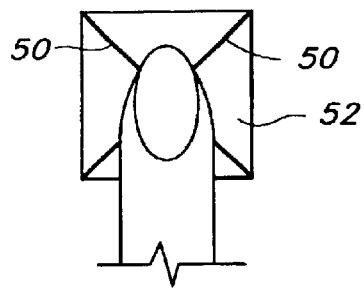
FIG. 2A is a top view of a button assembly selection device.
Figure 2B:
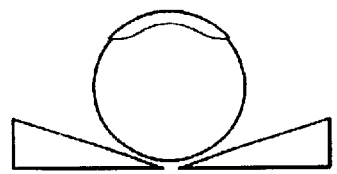
FIG. 2B a cross sectional view of the button assembly selection device of FIG. 2A.

Several different possible embodiments for the selection device 36 are shown in FIGS. 2A–2E. FIG. 2A is a top view showing a four triangular button design. Each triangular button has two legs 50 and a hypotenuse 52. The buttons are positioned so that one leg from each triangular button is positioned next to a leg 50 of one other triangular button. In this way the hypotenuses 52 of the four triangular buttons form a rectangle. The sectional view FIG. 2B shows that each triangular button is also sloped so that the thickness of each button is greatest along its hypotenuse 52 and least where the two legs 50 intersect.

Figure 2C:
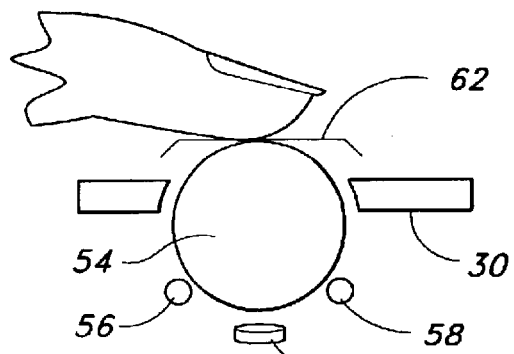
FIG. 2C is a cross sectional view of a roller ball selection device.

The selection device 36 may also be in the form of a track ball FIG. 2C. Track balls are well known in the art and consist of a spherical ball 54 which is rotatably secured inside the housing 30. The spherical ball is in contact with two rotational sensors 56, 58 and a push down contact 60. When in use, a user moves the portion of the spherical ball 62 that extends outside of the housing and the rotations are detected by the rotational sensors. The user can also press the spherical ball toward the push down contact 60. The push down contact will detect this motion by the user.

Figure 2D:
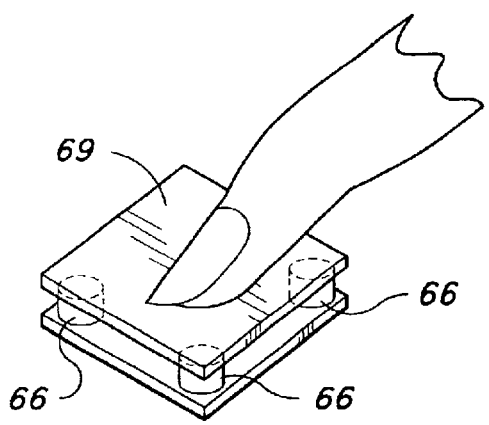
FIG. 2D is a perspective view of a touch pad selection device.

A third embodiment of a selection device is a touch pad with multiple contacts, shown in FIG. 2D. The touch pad has a flat rectangular panel 64 connected to five push down contacts 66 (three shown in FIG. 2D). The contacts are positioned one at each corner of the panel and one in the center of the panel. When a user presses near a corner of the pad or in the middle of the pad the pressure is detected by one of the contacts 66.

Figure 2E:
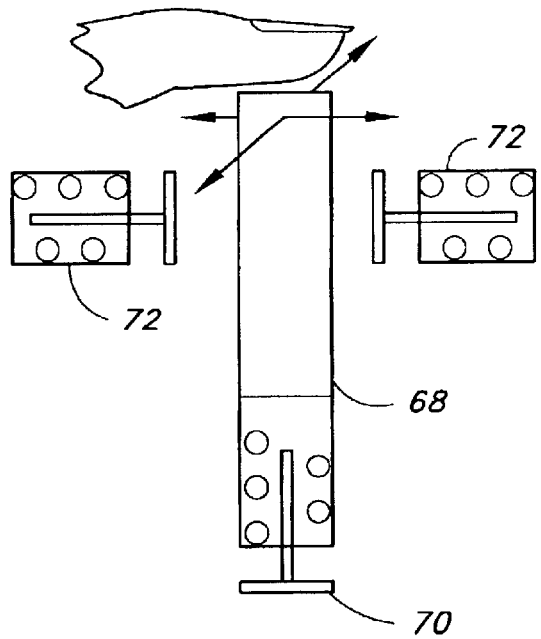
FIG. 2E is a cross sectional view of a joy stick selection device.
Figure 3A:
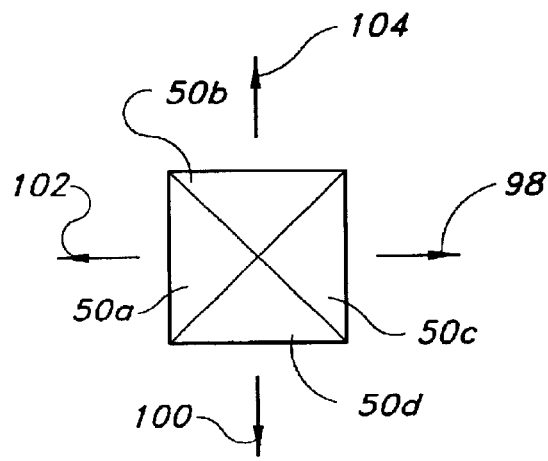
FIG. 3A is a top view of the button assembly selection device.
Figure 3B:
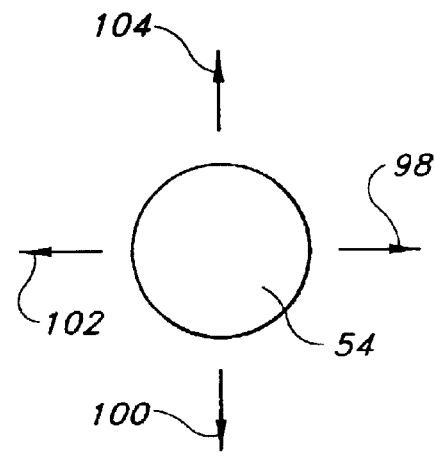
FIG. 3B is an top view of the roller ball selection device.
Figure 3C:
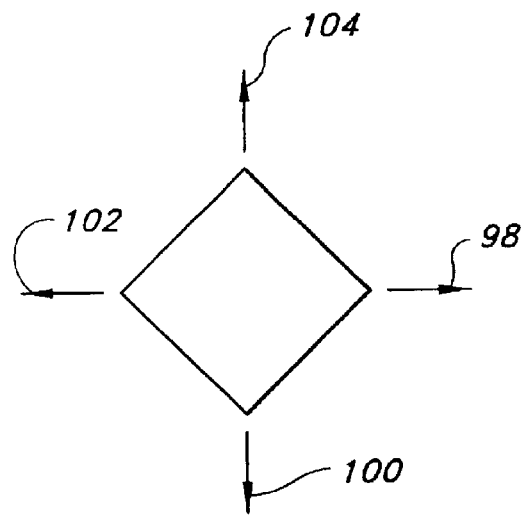
FIG. 3C is a top view of the touch pad selection device.
Figure 3D:
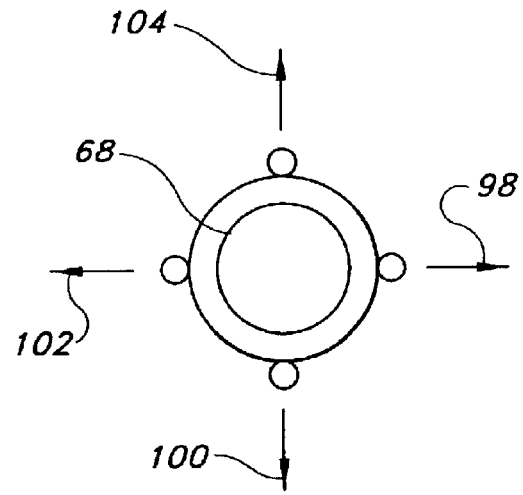
FIG. 3D is a top view of the joystick selection device.

A fourth embodiment of a selection device is a joystick, shown in FIG. 2E. Joysticks are well known in the art and have an elongated stick member 68 which has a bottom and top portion. The bottom portion is moveably connected to a push down contact 70. When the joystick is operated the user places one of his digits on top of the stick member and tips the stick forward, back, left, or right. These motions are detected by contacts 72 arranged in front, behind, and to the left and right of the stick member, respectively. The user may also press the top of the stick member 68 toward the push down contact 70. This motion would be detected by the push down contact.

FIGS. 3A–3D show top views of lateral directional movements which may be made with the embodiments of the selection device shown in FIGS. 2A–2E. The operation of each embodiment differs slightly, but the intended direction of operation is the same with each device. For example, the analogs of pushing the joystick 68 in the direction of arrow 98 in FIG. 3D would be pushing down button 50c on the button assembly of FIG. 3A, rolling the roller 54 of the roller ball FIG. 3B towards the direction of arrow 98 on the roller ball, or pushing down the corner of the direction pad FIG. 3C closest to the direction of arrow 98. The selection devices are each oriented with arrow 104 always pointing towards the top portion of the handheld device's housing 30. For this application, using the verbs push or press, and derivations thereof, when referring to the selection device will encompass all the motion analogs of all the embodiments of the selection device.

All of the functions of the software (to be discussed infra) can be controlled through the combined use of both the keys 32a–32d and the selection device 36. The active keyboard system may also, however, incorporate a motion detector to perform many of the functions performed by the selection device through physical movements of the handheld device.

Figure 4:
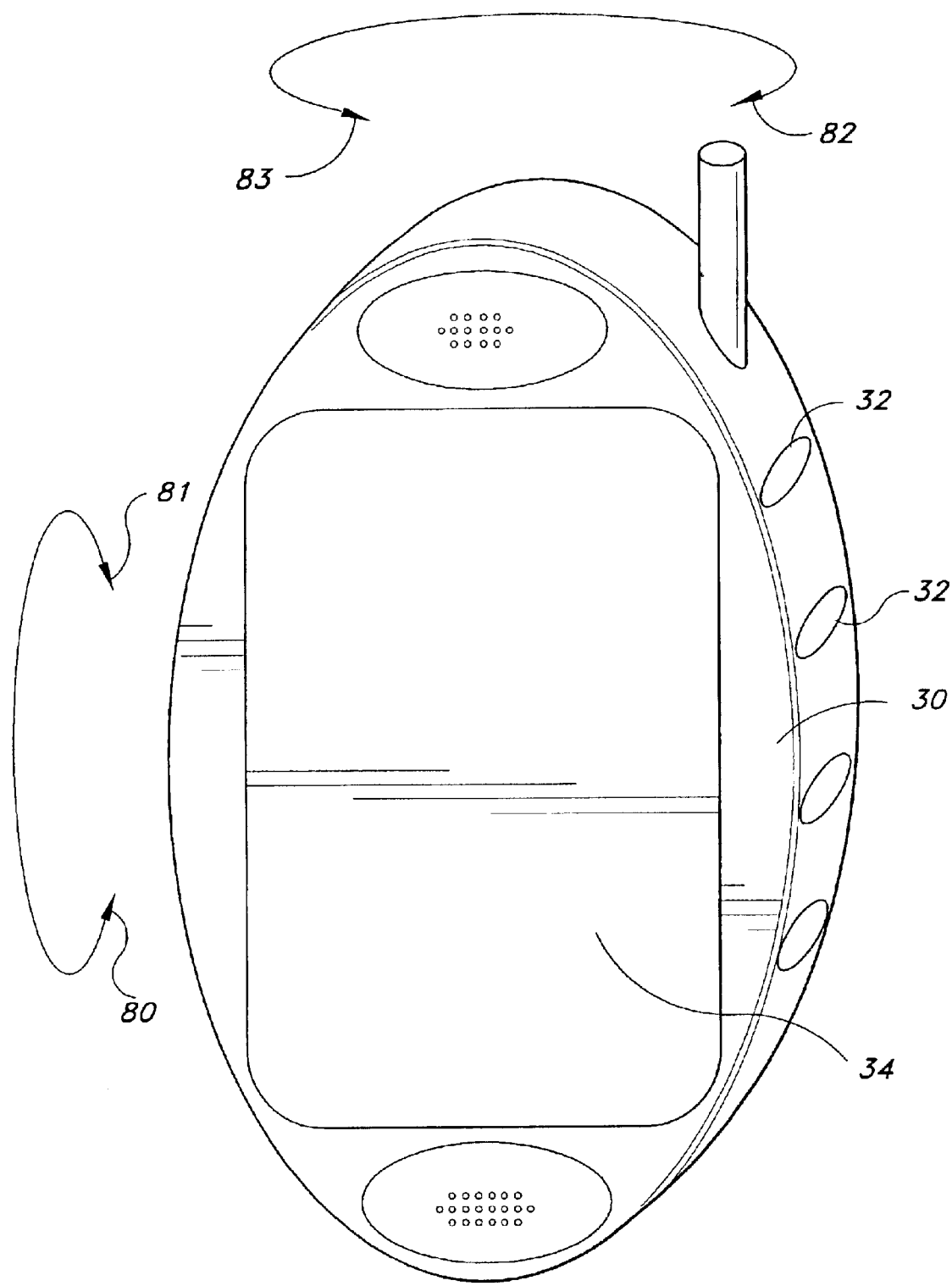
FIG. 4 is a perspective view of an active keyboard system devices equipped with a motion detector selection device with rotational direction arrows.

The active keyboard system, when equipped with motion detectors, can interpret rotational movements in directions 80, 81 (clockwise or counterclockwise about a horizontal axis through the device), and 82, 83 (clockwise and counterclockwise about a vertical axis through the device) as depicted in FIG. 4. These types of rotational movements are consistent with the type of movement a handheld device would undergo if the holder of the device flexed and extended, or rotated his wrist.

There are several different types of motion detectors which can be incorporated into the active keyboard, all of which are well known in the art and will only be discussed briefly here as they relate to the functional aspects of the active keyboard. One embodiment of the invention incorporates two acceleration sensors into the housing of the handheld device. Placement of the motion sensors is not critical as long as the sensors are capable of detecting their assigned range of movements. Gravitational sensors may also be used in the place of acceleration sensors. Gravitational sensors are well known in the art and typically start with a zero point fixed by the software using an internal or external reference point such as gravity, a gyroscope, a magnetic compass, or a G.P.S. system. From the zero point changes in orientation are recorded. The zero point would be periodically refreshed by the software.

Figure 5:
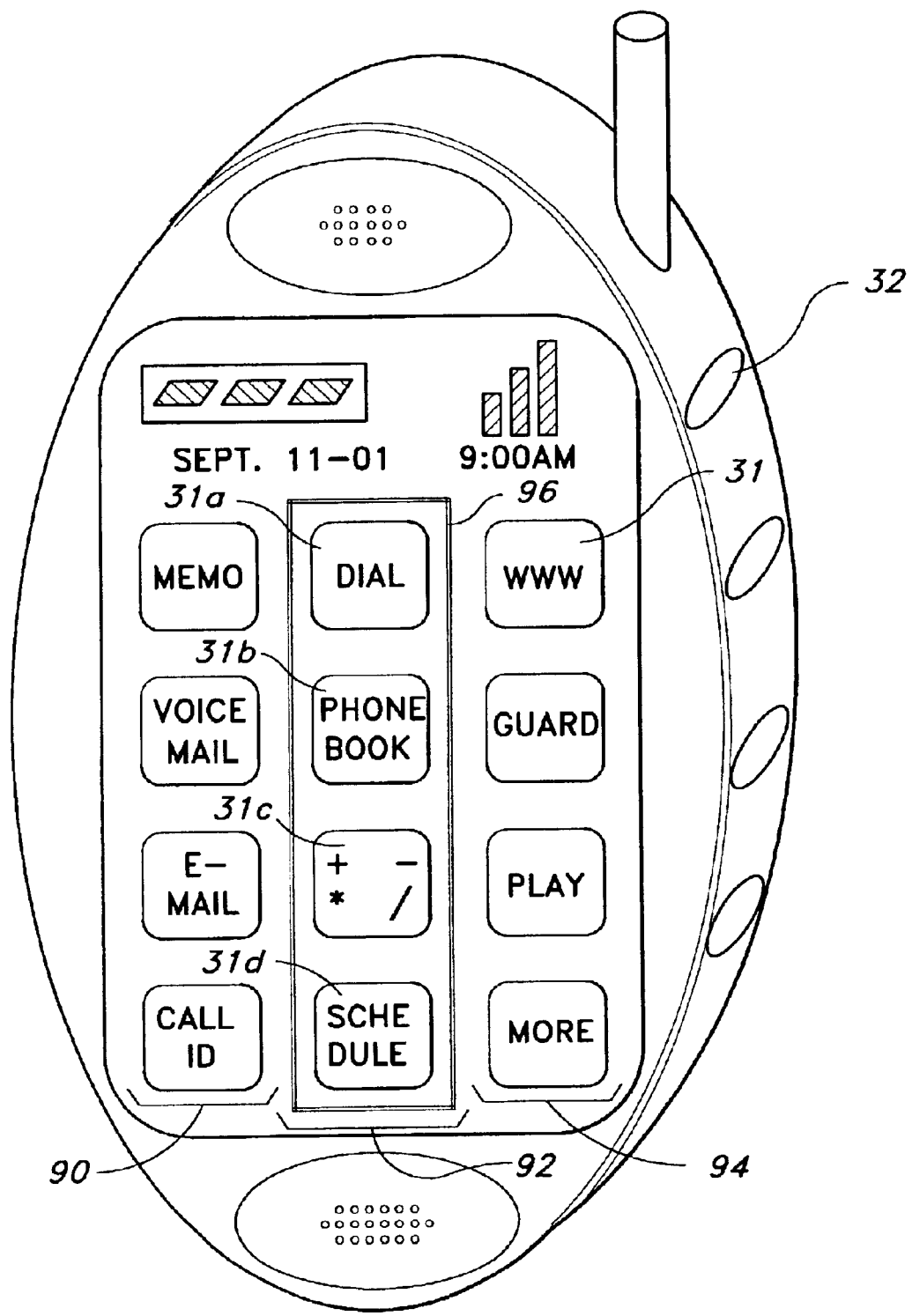
FIG. 5 is a front perspective view of a display device showing columns of selection boxes and a highlight box surrounding a column.

The active keyboard device has software which is stored in a memory device. The software works with the processor to output information to the display and interpret commands and data entered by the user. When power is applied to the device the user will have the option to select one of several modes of operation. The modes of operation will differ depending on the capability of the handheld device. The software has two selection techniques, box selection, and column selection. When using the column selection mode the display will show a grid of three vertical columns (90, 92, 94) of four possible selection boxes 31 per column, as shown in FIG. 5. The selection boxes contain the different possible modes of operation at startup, but the column selection technique may be used to input a variety of values into the handheld device.

Figure 6:
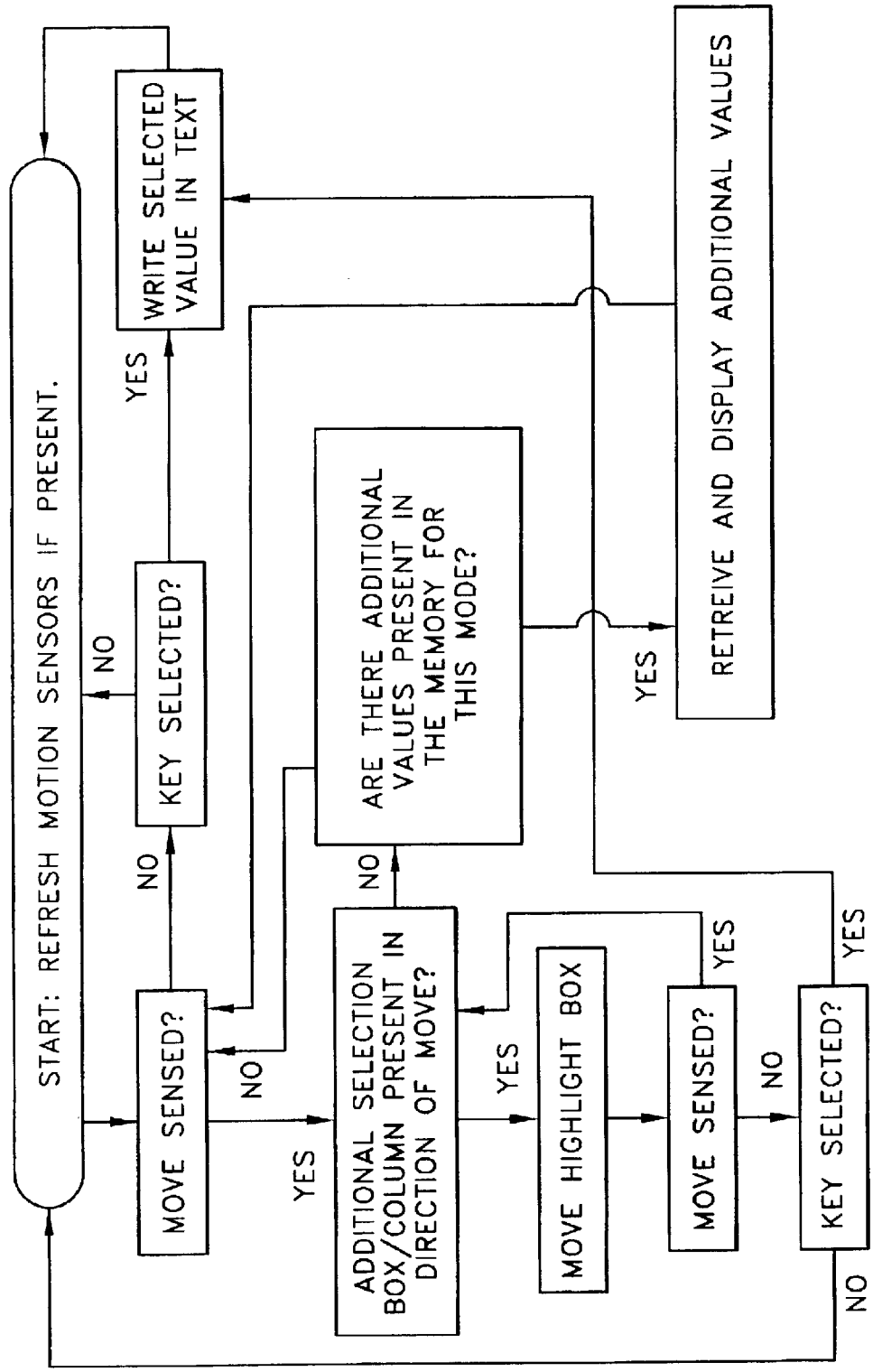
FIG. 6 is a flow chart showing variable selection logic.

The logic of using both the column and box selection techniques is shown in FIG. 6. At startup the center column 90 will be outlined with a highlight box 96. The user may select one of the values in the highlighted center column by depressing the key which is positioned directly to the side of the selection. In FIG. 5, for example, the value in selection box 31a would be assigned to the top key 32 and the value in selection box 31c would be assigned to the next to bottom key 32. Pressing the top key 32 would enter the value 31a into the memory of the electronic device.

A value could be chosen from a selection box in column 90 (left column) or 94 (right column) by using the selection device 36 to move the highlight box 96 to the left or right on the display. Pushing a selection device in the direction of the arrows in FIG. 3 will move, if permitted by the software, the highlight box on the display as follows: 98 (right), 100 (down), 102 (left) and 104 (up). When the highlight box is surrounding an entire column only movements in directions 98 (right) and 102 (left) are permitted.

If the user attempts to move the highlight box to the right when it is surrounding column 94 (right column) one of two options will occur. If there are no additional values in the memory for that mode of operation the highlight box will stay in position around the values in column 94. If additional values are present in the memory for that mode of operation, four (or the number of values remaining if less than four) of the additional values will appear in column 94, the values in column 94 will shift to column 92, the values in column 92 will shift to column 90, and the values previously in column 90 will be deleted from the display. This process is repeated until the last values for that mode are retrieved from memory, at which point the values will stop shifting columns. The values that were deleted from the display can be recovered in the same manner by moving the selection box in direction 102 when the highlight box is surrounding column 90.

When the active keyboard is used to dial a telephone number, or other limited value set, an additional feature may be added to the selection technique. After a number is input into the memory the highlight box returns to column 92. This is designed to insure that any value is never more than one movement of the highlight box away.

If the active keyboard is equipped with the previously mentioned motion detection devices, rotating the device will also result in movements of the highlight box. Moving a selection device in directions 98 (right) and 102 (left), as shown in FIG. 3, would produce instructions to the software equivalent to rotating, the handheld device in directions 83 (counterclockwise) and 82 (clockwise) as seen in FIG. 4. Moving the selection device in directions 104 (up) and 100 (down) are also equivalent to rotating the handheld device in directions 80 (counterclockwise) and 81 (clockwise).

Figure 7:
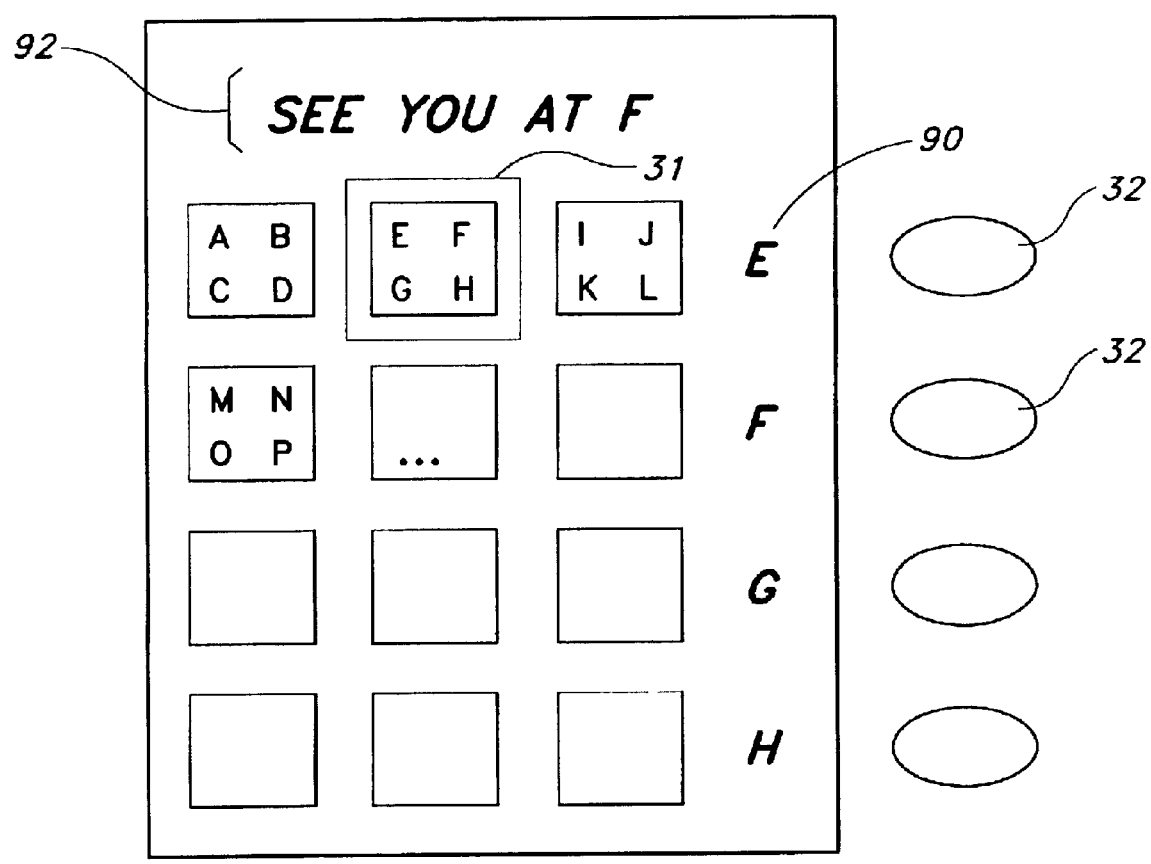
FIG. 7 is a diagrammatic front view of a display device showing columns of selection boxes and a highlight box surrounding one selection box.

The column selection technique as detailed above is sufficient when there are a relatively small number of variables to choose from (phone dialing, mode selection). Some applications, however, such as text messaging have a larger number of values. In that case, the highlight box 96 would encircle only one value box 31 (box selection) rather than an entire column (column selection) of four value boxes, as shown in FIG. 7. Each value box would contain up to four values rather than one value. When highlighted by the highlight box each value inside the value box would be assigned to a key 32. The values in the value box would also appear in a larger font 110 next to their assigned key. When entering text using box mode pressing two keys 32 at the same time would result in a space being entered into the message text or data stream. Text and data entered into the handheld device is shown on the display in the text area 112 above the columns, as seen in FIG. 7.

When in box selection mode the user has the ability to move the highlight box not only left and right but also up and down the display. This can be accomplished either by pushing a selection device in directions 104, 100, 102 and 98 or, when motion detectors are in place, through rotating the handheld device in directions 80, 81, 82, 83. Additional values, if present, can be selected by using the same technique described in column mode, where the user attempts to move the highlight box off the side of the display and a new column shifts into place.

Figure 8:
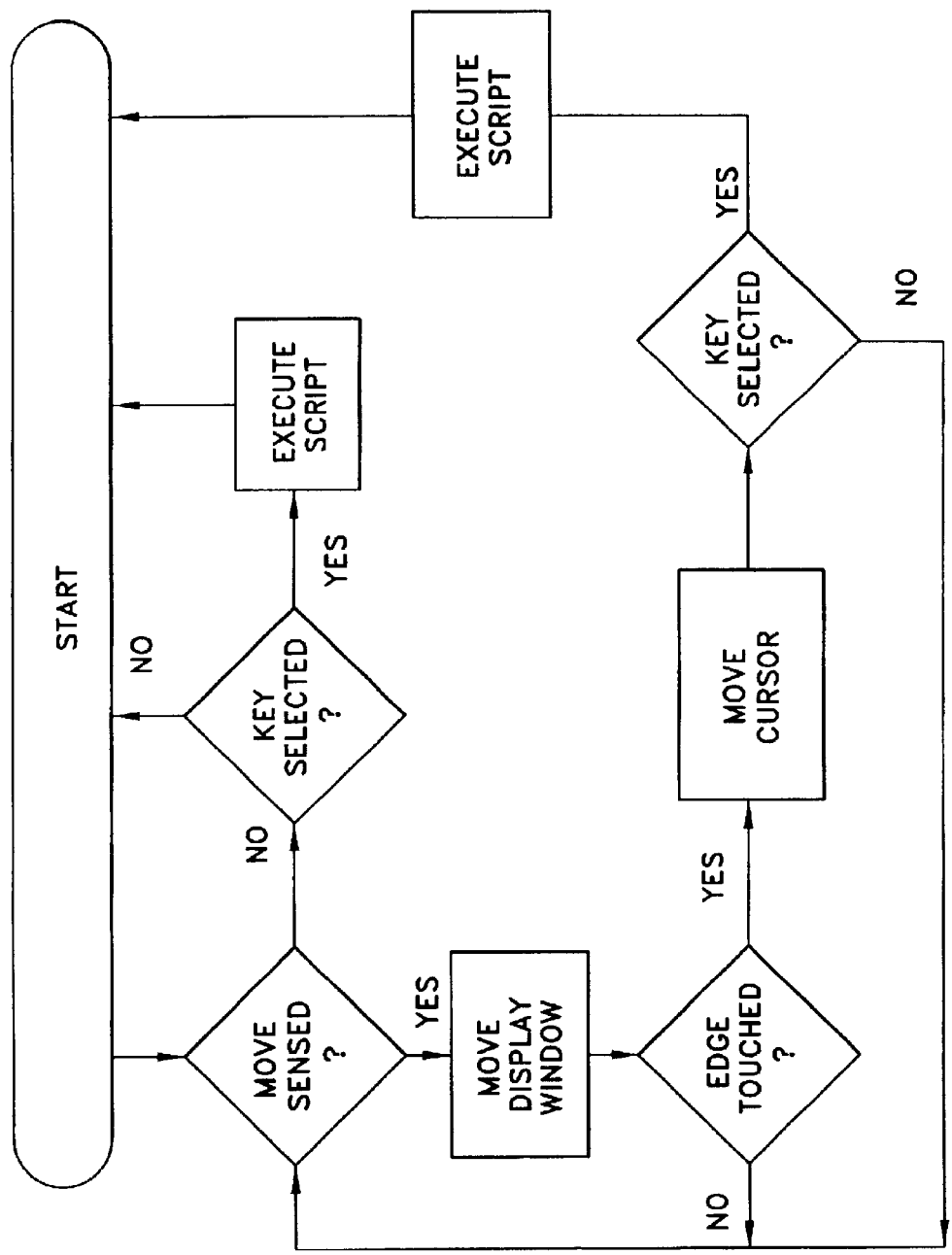
FIG. 8 is a flow chart of the logic involved in the adaptive keyboard's Internet browsing mode.
Figure 9:
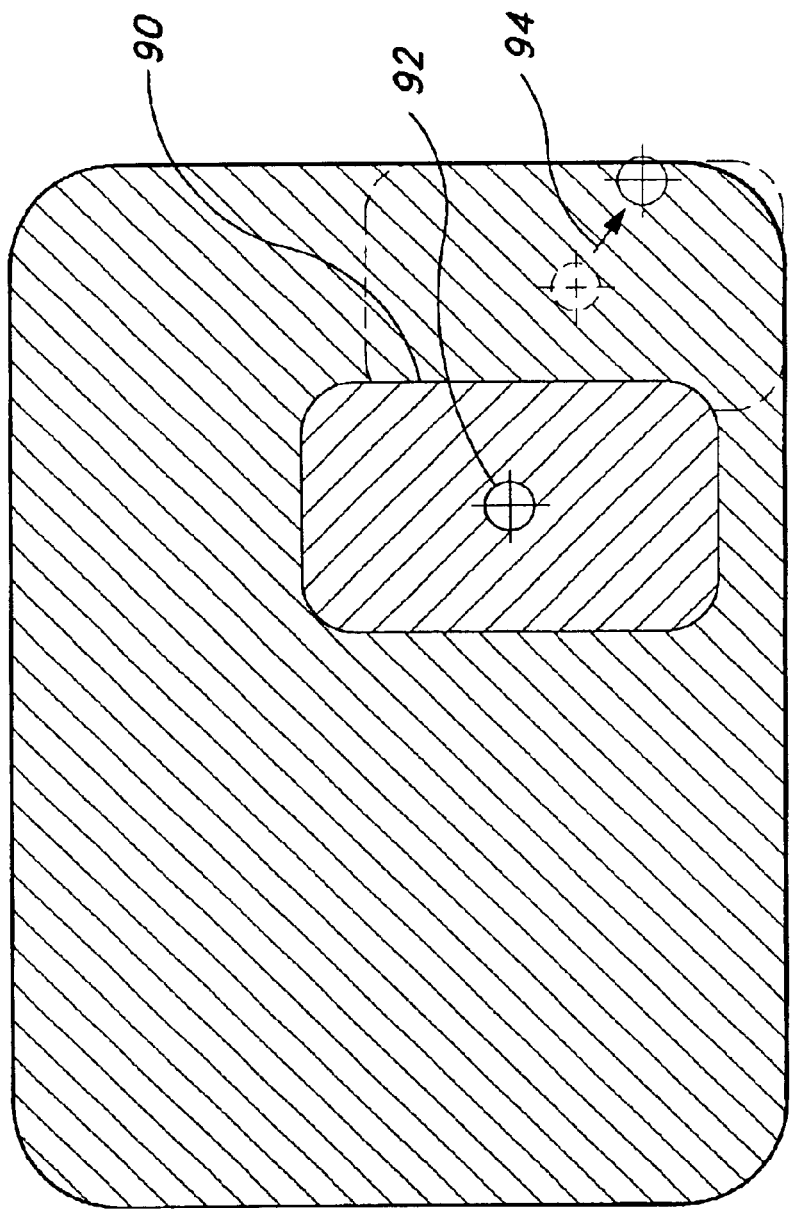
FIG. 9 is a front view of a computer screen with a shaded portion representing the portion of a page viewed on the active keyboard's display device.

When a handheld device is connected to the Internet the adaptive keyboard can operate in an Internet navigation mode. The logic of Internet navigation is detailed in FIG. 8. When in Internet navigation mode the display will show a portion of the web page. The user can move the displayed view 120 (seen in FIG. 9) of the page by using a selection device or through the use of the motion sensors. In Internet mode a cursor 122 appears in the middle of the displayed web page image. As the user navigates through a web page the cursor stays centered in the display until the image reaches the edge of the web page. At that point the motion of the image stops and the cursor continues 124 toward the edge of the screen FIG. 9. This allows the user to "click" on portions of the web page that are close to the edge of the page.

It is to be understood that the present invention is not limited to the sole embodiments described above, but encompasses any and all embodiments within the scope of the following claims.

I claim:

1. An active keyboard for handheld electronic devices comprising:
   a housing designed to be gripped by a human hand, having an interior and an exterior surface;
   a processor disposed within the interior of the housing;
   a display electronically connected to the processor;
   a selector disposed on the exterior surface of the housing, and positioned for activation by a thumb of a user;
   a plurality of keys disposed on the exterior surface of the housing, and positioned for activation by fingers of the user;
   a motion detector disposed within the interior of the housing;
   a memory connected to the processor; and
   a software means for displaying a menu on the display, the software means, when executed by the processor, cause the processor to carry out steps comprising:
     creating a grid of value boxes organized into a plurality of vertical columns and horizontal rows;
     enabling a user (1), by using the selector or motion detector, to select a group of value boxes, and (2), by using the plurality of keys, to select a value contained within one value box from the selected group and inputting the value into the memory;
     processing data from the motion detector caused by a rotational change in position of the housing;
     moving around the grid of value boxes based on processed data from the motion detector or the selector; and
     effecting functions of the active keyboard based on assigned values selected by keys, processed data from the motion detector, a state of the selector, or combinations thereof,
   wherein the active keyboard is configured to be held and operated by a single human hand.

2. The active keyboard according to claim 1, wherein the motion detector is selected from the group consisting of an acceleration sensor, a tilt sensor, a magnetic sensor, and an electromagnetic sensor.

3. The active keyboard according to claim 1, wherein the housing is ergonomically shaped.

4. The active keyboard according to claim 1, wherein the selector is selected from the group consisting of a joystick, a touch pad, a trackball, and a plurality of close proximity triangular buttons.

5. The active keyboard according to claim 1, further comprising a microphone and a speaker.

6. The active keyboard according to claim 1, wherein the software means further comprises means for navigating the Internet using the motion detector to control a portion of a web page shown on the display, maintaining a cursor position in a center of the display, so that the cursor is moveable by the selector from the center of the display.

7. The active keyboard according to claim 1, wherein the software means further comprises means for navigating the Internet using the selector to control a portion of a web page shown on the display, maintaining a cursor position in a center of the display, so that when the display reaches a boundary of the web page, the cursor is moveable by the selector from the center of the display.

8. A method of inputting data into a handheld electronic device comprising the steps of:
   using a processor and a memory to create a grid of value boxes organized into a plurality of vertical columns and horizontal rows;
   displaying the grid on a display;
   inputting at least one value into each value box;
   creating a highlight box which marks a selected group of value boxes;
   moving the highlight box to surround a selected value box having a desired value;
   assigning one value from the selected value box surrounded by the highlight box to one of a plurality of keys;
   depressing one of the plurality of keys and entering the value into the memory and displaying the value on the display;
   moving the highlight box and assigning values surrounded by the highlight box to the plurality of keys and entering the assigned values as in the previous moving, assigning and depressing steps;
   repeating the process until finished entering values;
   processing data from a motion detector caused by a rotational change in position of the electronic device;
   moving around the grid of value boxes based on processed data from the motion detector; and
   effecting functions of the electronic device based on assigned values selected by keys, processed data from the motion detector, a state of a selector, or combinations thereof.

9. A method of inputting data into a handheld electronic device comprising the steps of:
   using a processor and a memory to create a grid of value boxes;
   displaying the grid on a display;
   inputting up to four values into each value box;
   creating a highlight box which surrounds a value box;
   moving the highlight box to surround a value box having a desired value;
   assigning each value from the value box surrounded by the highlight box to one of a plurality of keys;

depressing one of the plurality of keys and entering the value assigned to the one depressed key into the memory and displaying the assigned value on the display;

moving the highlight box and assigning values surrounded by the highlight box to one of the plurality of keys and entering the values as in the previous moving, assigning and depressing steps;

repeating the process until finished entering values;

processing data from a motion detector caused by a rotational change in position of the electronic device;

moving around the grid of value boxes based on processed data from the motion detector; and effecting functions of the electronic device based on assigned values selected by keys, processed data from the motion detector, a state of a selector, or combinations thereof.

* * * * *